(12) United States Patent
Price

(10) Patent No.: US 8,123,401 B2
(45) Date of Patent: Feb. 28, 2012

(54) PROBE COVER HAVING A BLACKBODY

(75) Inventor: Jeffrey E. Price, Wildwood, MO (US)

(73) Assignee: Covidien AG (CH)

( * ) Notice: Subject to any disclaimer, the term of this patent is extended or adjusted under 35 U.S.C. 154(b) by 285 days.

(21) Appl. No.: 12/418,217

(22) Filed: Apr. 3, 2009

(65) Prior Publication Data

US 2009/0185598 A1 Jul. 23, 2009

Related U.S. Application Data

(60) Continuation of application No. 11/943,254, filed on Nov. 20, 2007, now Pat. No. 7,530,738, which is a division of application No. 11/379,743, filed on Apr. 21, 2006, now abandoned.

(51) Int. Cl.
*G01K 15/00* (2006.01)
*G01K 1/16* (2006.01)
*G01K 1/08* (2006.01)
*G01J 5/04* (2006.01)

(52) U.S. Cl. ............ 374/158; 374/209; 374/2; 374/129; 600/474; 600/184; 600/549

(58) Field of Classification Search .................. 374/1–2, 374/100, 163, 183, 158, 208–209, 120–121, 374/129; 600/474, 540, 549, 184; 250/338.1
See application file for complete search history.

(56) References Cited

U.S. PATENT DOCUMENTS

| | | | |
|---|---|---|---|
| 3,282,106 A | 11/1966 | Barnes | |
| 3,282,458 A | 11/1966 | Rudd | |
| 3,626,758 A | 12/1971 | Stewart et al. | |
| 3,681,991 A | 8/1972 | Eberly, Jr. | |
| 3,738,479 A | 6/1973 | Sato | |
| 3,765,238 A | 10/1973 | Sumikama et al. | |
| 3,822,593 A | 7/1974 | Oudewaal | |
| 3,832,669 A | 8/1974 | Mueller et al. | |
| 3,872,728 A | 3/1975 | Joyce et al. | |
| 3,884,219 A * | 5/1975 | Richardson et al. | 600/537 |
| 3,905,232 A | 9/1975 | Knute | |
| 3,915,371 A | 10/1975 | Crabtree | |
| 3,942,891 A | 3/1976 | Spielberger et al. | |
| 3,949,740 A | 4/1976 | Twentier | |

(Continued)

FOREIGN PATENT DOCUMENTS

EP 0201790 A1 11/1986

(Continued)

OTHER PUBLICATIONS

European Search Report, Application 07007704.5, dated Jan. 11, 2008, 12 pgs.

(Continued)

*Primary Examiner* — Gail Verbitsky
(74) *Attorney, Agent, or Firm* — Lisa E. Winsor, Esq.

(57) ABSTRACT

A probe cover for an infrared electronic thermometer including a generally tubular body having open first and second ends. The body is sized and shaped to receive a probe of the infrared electronic thermometer into the body through the first end. The probe cover further includes a film closing the second end of the body. The film has a metallic region defining a blackbody portion for rapidly equilibrating to a temperature corresponding to the temperature of an object for viewing by a sensor of the electronic thermometer to measure the temperature of the object.

6 Claims, 9 Drawing Sheets

U.S. PATENT DOCUMENTS

| | | | |
|---|---|---|---|
| 4,007,832 A | 2/1977 | Paull et al. | |
| 4,008,614 A | 2/1977 | Turner et al. | |
| 4,117,926 A * | 10/1978 | Turner et al. | 374/209 |
| 4,143,765 A | 3/1979 | Moss, III | |
| 4,159,766 A | 7/1979 | Kluge | |
| 4,183,248 A * | 1/1980 | West | 374/164 |
| 4,349,109 A | 9/1982 | Scordato et al. | |
| 4,457,633 A | 7/1984 | Andrews | |
| 4,497,585 A | 2/1985 | Paull et al. | |
| 4,527,896 A | 7/1985 | Irani et al. | |
| 4,572,365 A | 2/1986 | Bruno et al. | |
| 4,576,486 A | 3/1986 | Dils | |
| 4,602,642 A | 7/1986 | O'Hara et al. | |
| 4,622,360 A | 11/1986 | Gomi et al. | |
| 4,636,091 A | 1/1987 | Pompei et al. | |
| 4,662,360 A * | 5/1987 | O'Hara et al. | 600/200 |
| 4,703,857 A | 11/1987 | Jahnen et al. | |
| 4,770,544 A | 9/1988 | Mossey | |
| 4,784,149 A | 11/1988 | Berman et al. | |
| 4,790,324 A | 12/1988 | O'Hara et al. | |
| 4,854,730 A | 8/1989 | Fraden | |
| 4,895,164 A * | 1/1990 | Wood | 600/549 |
| 4,911,559 A | 3/1990 | Meyst et al. | |
| 4,993,424 A | 2/1991 | Suszynski et al. | |
| 5,017,018 A | 5/1991 | Iuchi et al. | |
| 5,018,872 A | 5/1991 | Suszynski et al. | |
| D318,812 S | 8/1991 | Matsuura et al. | |
| 5,046,482 A | 9/1991 | Everest | |
| 5,060,819 A | 10/1991 | Apps | |
| 5,066,142 A | 11/1991 | DeFrank et al. | |
| 5,078,507 A * | 1/1992 | Koller | 374/159 |
| 5,088,834 A | 2/1992 | Howe et al. | |
| 5,100,018 A | 3/1992 | Rosati et al. | |
| 5,163,418 A | 11/1992 | Fraden et al. | |
| 5,179,936 A | 1/1993 | O'Hara et al. | |
| 5,188,459 A | 2/1993 | Mino et al. | |
| 5,292,001 A | 3/1994 | Langenbeck et al. | |
| RE34,599 E | 5/1994 | Suszynski et al. | |
| 5,318,029 A | 6/1994 | Palese | |
| 5,364,186 A * | 11/1994 | Wang et al. | 374/126 |
| 5,411,032 A | 5/1995 | Esseff et al. | |
| 5,441,702 A | 8/1995 | Lemieux et al. | |
| 5,487,607 A | 1/1996 | Makita et al. | |
| 5,516,010 A | 5/1996 | O'Hara et al. | |
| 5,518,114 A | 5/1996 | Kohring et al. | |
| 5,601,365 A | 2/1997 | Li | |
| 5,609,564 A | 3/1997 | Makita et al. | |
| 5,638,951 A | 6/1997 | Fukura et al. | |
| 5,645,350 A | 7/1997 | Jang | |
| 5,795,067 A | 8/1998 | Fraden et al. | |
| 5,795,632 A | 8/1998 | Buchalter | |
| 5,820,264 A | 10/1998 | Tsao et al. | |
| 5,833,367 A | 11/1998 | Cheslock et al. | |
| 5,836,692 A | 11/1998 | Pompei | |
| 5,906,437 A | 5/1999 | Lin | |
| 5,948,362 A | 9/1999 | Steinbrenner et al. | |
| 5,980,451 A | 11/1999 | O'Hara et al. | |
| 5,994,701 A * | 11/1999 | Tsuchimoto et al. | 250/351 |
| 6,001,066 A | 12/1999 | Canfield et al. | |
| 6,022,140 A | 2/2000 | Fraden et al. | |
| 6,030,117 A | 2/2000 | Cheslock et al. | |
| 6,042,266 A * | 3/2000 | Cheslock et al. | 374/158 |
| 6,084,395 A | 7/2000 | Thiel | |
| 6,097,979 A | 8/2000 | Janotte | |
| 6,109,784 A | 8/2000 | Weiss | |
| 6,123,454 A | 9/2000 | Canfield et al. | |
| 6,139,182 A | 10/2000 | Levatter et al. | |
| 6,152,596 A | 11/2000 | Fraden | |
| 6,156,148 A | 12/2000 | Beerwerth et al. | |
| 6,179,785 B1 | 1/2001 | Martinosky et al. | |
| 6,186,959 B1 | 2/2001 | Canfield et al. | |
| 6,193,411 B1 | 2/2001 | Chen | |
| 6,195,581 B1 | 2/2001 | Beerwerth et al. | |
| 6,224,256 B1 * | 5/2001 | Bala | 374/158 |
| 6,236,880 B1 | 5/2001 | Raylman et al. | |
| 6,238,088 B1 | 5/2001 | Wu | |
| 6,238,089 B1 | 5/2001 | Vodzak et al. | |
| 6,254,271 B1 | 7/2001 | Lin | |
| 6,319,206 B1 | 11/2001 | Pompei et al. | |
| 6,332,090 B1 | 12/2001 | DeFrank et al. | |
| 6,347,243 B1 | 2/2002 | Fraden | |
| 6,367,973 B2 | 4/2002 | Yamaka | |
| 6,386,757 B1 | 5/2002 | Konno | |
| 6,390,671 B1 | 5/2002 | Tseng | |
| 6,402,371 B2 | 6/2002 | Pompei et al. | |
| 6,416,602 B1 | 7/2002 | Firatli | |
| 6,447,160 B1 * | 9/2002 | Fraden | 374/2 |
| 6,485,433 B1 | 11/2002 | Peng | |
| 6,530,881 B1 | 3/2003 | Ailinger et al. | |
| 6,549,794 B1 | 4/2003 | Nadeau, Jr. et al. | |
| 6,605,034 B2 | 8/2003 | Hascoet et al. | |
| 6,612,735 B2 | 9/2003 | Tomioka et al. | |
| 6,634,787 B1 | 10/2003 | Beerwerth et al. | |
| 6,647,284 B1 | 11/2003 | Lee | |
| 6,694,174 B2 | 2/2004 | Kraus et al. | |
| 6,695,474 B2 | 2/2004 | Beerwerth et al. | |
| 6,733,464 B2 | 5/2004 | Olbrich et al. | |
| 6,749,334 B2 | 6/2004 | Lin | |
| 6,761,684 B1 | 7/2004 | Speier | |
| 6,773,405 B2 | 8/2004 | Fraden et al. | |
| 6,786,636 B1 | 9/2004 | Huang et al. | |
| 6,789,936 B1 | 9/2004 | Kraus et al. | |
| 6,814,697 B2 | 11/2004 | Ouchi | |
| 6,827,486 B2 | 12/2004 | Welker | |
| 6,840,402 B2 | 1/2005 | Lin et al. | |
| 6,846,105 B2 | 1/2005 | Xie et al. | |
| 6,851,850 B1 | 2/2005 | Lee | |
| 6,854,880 B2 | 2/2005 | Hsieh | |
| 6,855,108 B2 | 2/2005 | Ishibiki et al. | |
| 6,869,393 B2 | 3/2005 | Butler | |
| 6,908,439 B2 | 6/2005 | Carney | |
| 6,911,005 B2 | 6/2005 | Ouchi et al. | |
| 6,921,362 B2 | 7/2005 | Ouchi | |
| 6,929,601 B2 | 8/2005 | Nakao | |
| 6,932,775 B2 | 8/2005 | Pompei et al. | |
| 6,939,039 B2 | 9/2005 | Brunvoll | |
| 6,949,069 B2 | 9/2005 | Farkas et al. | |
| 6,957,911 B2 | 10/2005 | Wong et al. | |
| 6,964,517 B2 | 11/2005 | Welker | |
| 6,979,122 B2 | 12/2005 | Yu | |
| 6,981,796 B2 | 1/2006 | Hsieh | |
| 6,991,368 B2 | 1/2006 | Gerlitz | |
| 7,004,623 B2 | 2/2006 | Nakagawa et al. | |
| 7,025,500 B2 | 4/2006 | Tabata | |
| 7,036,984 B2 | 5/2006 | Penney et al. | |
| 7,083,330 B1 | 8/2006 | Yao | |
| 7,108,419 B2 | 9/2006 | Harr | |
| 7,141,792 B2 * | 11/2006 | Tomita et al. | 250/336.1 |
| 7,195,599 B2 | 3/2007 | Carney et al. | |
| 7,217,929 B2 * | 5/2007 | Hirai et al. | 250/370.01 |
| 7,237,949 B2 | 7/2007 | Lantz et al. | |
| 7,255,475 B2 | 8/2007 | Quinn et al. | |
| 7,354,194 B2 | 4/2008 | Walker et al. | |
| 7,381,189 B2 | 6/2008 | Friedman et al. | |
| 7,422,365 B2 * | 9/2008 | Chamberlain et al. | 374/120 |
| 7,478,946 B2 | 1/2009 | Harr et al. | |
| 7,520,671 B2 * | 4/2009 | Lantz et al. | 374/158 |
| 2003/0067957 A1 | 4/2003 | Ko et al. | |
| 2003/0176809 A1 | 9/2003 | Lin | |
| 2005/0002437 A1 | 1/2005 | Fraden | |
| 2005/0083991 A1 | 4/2005 | Wong | |
| 2005/0226307 A1 | 10/2005 | Lussier et al. | |
| 2005/0263707 A1 * | 12/2005 | Tomita et al. | 250/370.01 |
| 2006/0214843 A1 * | 9/2006 | Klein et al. | 342/351 |
| 2007/0189358 A1 | 8/2007 | Lane et al. | |
| 2007/0253870 A1 | 11/2007 | Weiss et al. | |
| 2007/0268956 A1 | 11/2007 | Walker et al. | |
| 2008/0123717 A1 * | 5/2008 | Lane et al. | 374/209 |
| 2008/0175301 A1 | 7/2008 | Chen | |
| 2009/0122836 A1 | 5/2009 | Li | |
| 2011/0134962 A1 * | 6/2011 | Fraden | 374/209 |

FOREIGN PATENT DOCUMENTS

| | | |
|---|---|---|
| EP | 0292417 B1 | 3/1993 |
| EP | 0589212 B1 | 3/1994 |
| EP | 0890829 A1 | 1/1999 |
| JP | 4299225 A | 10/1992 |

| | | | |
|---|---|---|---|
| JP | 10090070 A | | 2/1994 |
| JP | 06160127 A | | 6/1994 |
| JP | 6197869 A | | 7/1994 |
| JP | 06043037 A | | 4/1998 |
| JP | 11037853 A | | 2/1999 |
| JP | 11188008 A | | 7/1999 |
| JP | 2000225095 | | 8/2000 |
| JP | 2001218742 A | | 8/2001 |
| JP | 2002051989 A | | 2/2002 |
| JP | 2002107230 A | * | 4/2002 |
| JP | 2002214046 A | | 7/2002 |
| JP | 2002-355225 A | | 12/2002 |
| JP | 2003-116795 A | | 4/2003 |
| JP | 2003190106 A | * | 7/2003 |
| WO | 9821556 A1 | | 5/1998 |
| WO | 0052434 | | 9/2000 |
| WO | 2004063686 A1 | | 7/2004 |

OTHER PUBLICATIONS

Mohammad-Irfan Suleman, et al, "Insufficiency in a New Temporal-Artery Thermometer for Adult and Pediatric Patients", Anesthesia Analgesia, vol. 95, No. 1, Jan. 2002, 5 pages.

Anonymous, "FirstTemp Genius User Guide", Mar. 2004, Tyco Healthcare, XP002444529, "the whole document".

Anonymous, "FirstTemp Genius Infrared Thermometry", Feb. 2004, Tyco Healthcare, XP002444549, pp. 1-4.

Tyco Healthcare brochure, "Temperature Monitoring", Jan. 2000, pp. TM-1-TM-8.

Hebbar, Kiran, et al., "Comparison of Temporal Artery Thermometer to Standard Temperature Measurements in Pediatric Intensive Care Unit Patients", Pediatric Critical Care Medicine, vol. 6, No. 5, Sep. 2005, 5 pages.

* cited by examiner

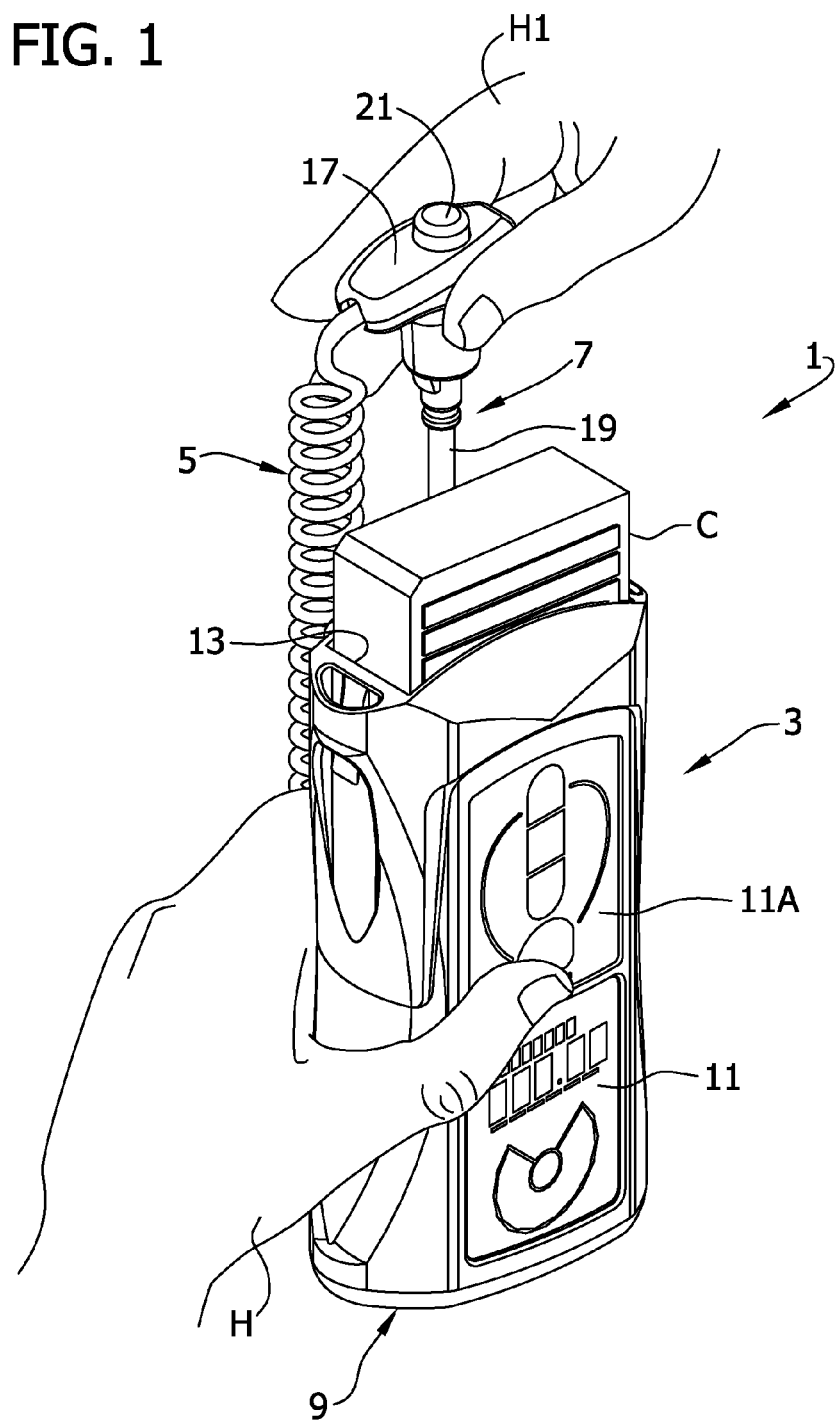

PROBE COVER HAVING A BLACKBODY

CROSS-REFERENCE TO RELATED APPLICATION

This is a continuation application of U.S. patent application Ser. No. 11/943,254, filed Nov. 20, 2007, which is a divisional patent application of U.S. patent application Ser. No. 11/379,743, filed Apr. 21, 2006 (now abandoned), both of which are herein incorporated by reference.

FIELD OF THE INVENTION

The present invention generally relates to a probe cover and more specifically to probe cover for an infrared electronic thermometer that is suitable for oral body temperature measurement.

BACKGROUND OF THE INVENTION

Electronic thermometers are widely used in the healthcare field for measuring a patient's body temperature. Typical electronic thermometers have the form of a probe with an elongated shaft. Electronic temperature sensors such as thermistors or other temperature sensitive elements are contained within the shaft portion. In one version, the probe includes a cup-shaped aluminum tip at its distal end. A thermistor is placed in thermal contact with the aluminum tip inside the probe. When a distal end portion is placed, for example, in a patient's mouth, the tip is heated up by the patient's body and the thermistor measures the temperature of the tip. Additional electronics connected to the electronic sensor components may be contained within a base unit connected by wire to the shaft portion or may be contained within a handle of the shaft portion, for example. Electronic components receive input from the sensor components to compute the patient's temperature. The temperature is then typically displayed on a visual output device such as a seven segment numerical display device. Additional features of known electronic thermometers include audible temperature level notification such as a beep or tone alert signal. A disposable cover or sheath is typically fitted over the shaft portion and disposed after each use of the thermometer for sanitary reasons.

Electronic thermometers have many advantages over conventional thermometers and have essentially replaced the use of conventional glass thermometers in the healthcare field. One advantage of electronic thermometers over their conventional glass counterparts is the speed at which a temperature reading can be taken. Several procedures are used to promote a rapid measurement of the subject's temperature. One technique employed is to use predictive algorithms as part of thermometer logic to extrapolate the temperature measurements from the thermistor in contact with the tip to arrive at a temperature reading in advance of the tip reaching equilibrium with the body temperature. Another technique that can be employed simultaneously with a predictive algorithm is to heat the probe to near the body temperature so that part of the probe away from the tip does not act as a heat sink, allowing the tip to reach a temperature close to the body temperature more rapidly. Heating can be accomplished by a thermistor placed in contact with the probe. Another thermistor may be placed in contact with the probe to measure the amount the resistor is heating the probe, which is used to control the heating. It is also known to use an isolator to reduce heat loss from the tip to other parts of the probe.

It would be desirable to improve further upon the conventional electronic thermometer. In particular, the electronic thermometer is challenging to assemble because of the various small components that must be placed in the probe. Moreover, although the electronic thermometer quickly provides a body temperature measurement, particularly as compared to conventional glass thermometers, additional speed would be desirable. Moreover in order to obtain the temperature quickly, the probe is heated, which causes a power drain on the batteries. Still further, rapid temperature measurement also relies upon the use of predictive algorithms that add to the complexity of the thermometer.

SUMMARY OF THE INVENTION

In one aspect of the present invention, a probe cover for an infrared electronic thermometer generally comprises a generally tubular body having open first and second ends. The body is sized and shaped to receive a probe of the infrared electronic thermometer into the body through the first end. The probe cover further includes a film closing the second end of the body. The film includes a metallic region defining a blackbody portion for rapidly equilibrating to a temperature corresponding to the temperature of an object for viewing by a sensor of the electronic thermometer to measure the temperature of the object.

In another aspect of the present invention, a probe cover for an infrared electronic thermometer generally comprises a generally tubular body having open first and second ends. The body is sized and shaped to receive a probe of the infrared electronic thermometer into the body through the first end. The probe cover further includes a film closing the second end of the body. The film includes a metallic region defining a blackbody portion for rapidly equilibrating to a temperature corresponding to the temperature of an object for viewing by a sensor of the electronic thermometer to measure the temperature of the object. The blackbody portion is made of a different material than the tubular body.

Other objects and features will be in part apparent and in part pointed out hereinafter.

BRIEF DESCRIPTION OF THE DRAWINGS

FIG. 1 is a perspective of an infrared electronic thermometer;

Corresponding reference characters indicate corresponding parts throughout the drawings.

DETAILED DESCRIPTION OF THE INVENTION

Figure 1A:
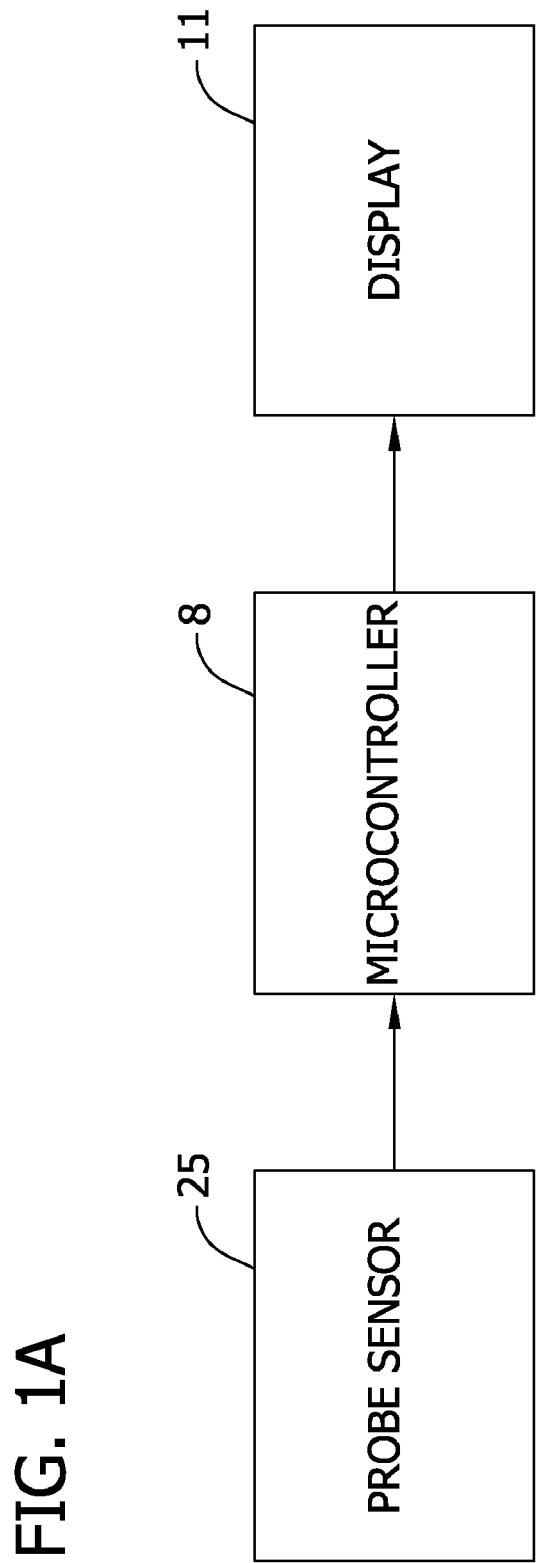
FIG. 1A is a diagrammatic representation of the thermometer.
Figure 2:
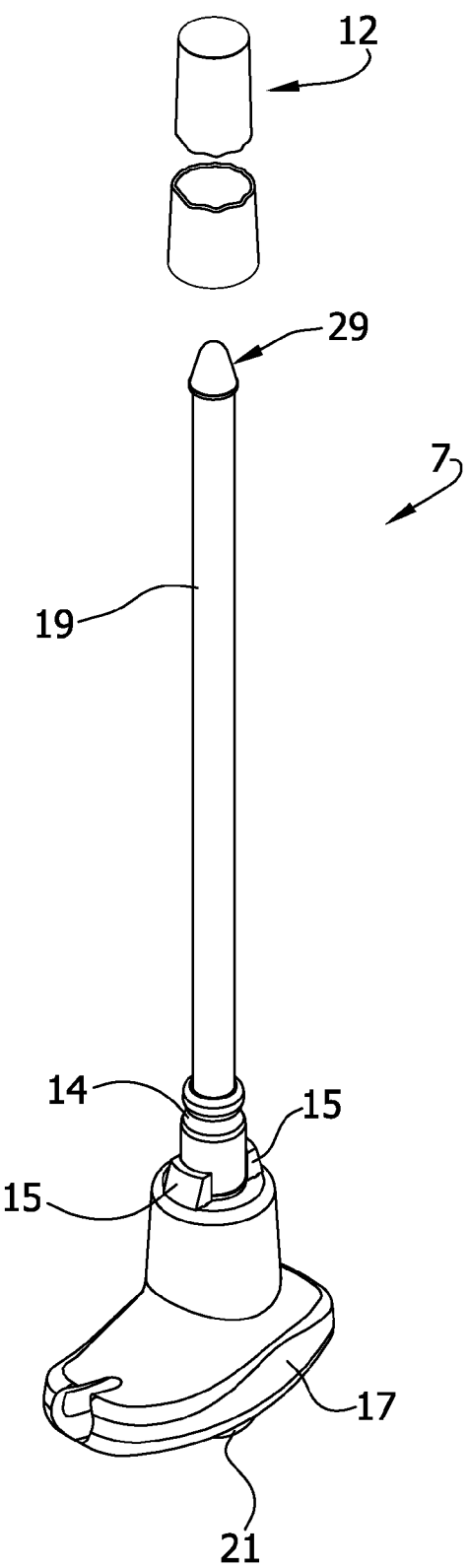
FIG. 2 is a perspective of a probe of the thermometer.

Referring now to the drawings, and in particular to FIGS. 1 and 2, an electronic thermometer constructed according to the principles of the present invention is indicated generally at 1. The electronic thermometer comprises a temperature calculating unit, indicated generally at 3, that is sized and shaped to be held comfortably in the hand H. The calculating unit 3 (broadly, "a base unit") is connected by a helical cord 5 to a probe 7 (the reference numerals indicating their subjects generally). It will be appreciated that calculation electronics could be incorporated into the probe so that a separate base unit and connection cord could be omitted. The probe 7 is constructed for contacting the subject (e.g., a patient) and sending signals to the calculating unit 3 representative of the temperature. The calculating unit 3 receives the signals from the probe 7 and uses them to calculate the temperature. Suitable circuitry, such as a programmable microcontroller 8, for performing these calculations is contained within a housing 9 of the calculating unit 3. The circuitry makes the calculated temperature appear on a LCD display 11 on the front of the housing 9. The microcontroller 8 in the calculating unit 3 can be calibrated to convert the temperature signal from the probe 7 to the temperature of the object being measured. In the illustrated embodiment, a direct temperature measurement is made. However, it will be understood that the microcontroller 8 could include predictive software to provide a temperature reading for exhibition on the display 11 prior to the temperature signal output from the probe 7 to the microcontroller becoming steady state. Other information desirably can appear on the display 11, as will be appreciated by those of ordinary skill in the art. A panel 11A of buttons for operating the thermometer 1 is located just above the display 11.

Figure 2A:
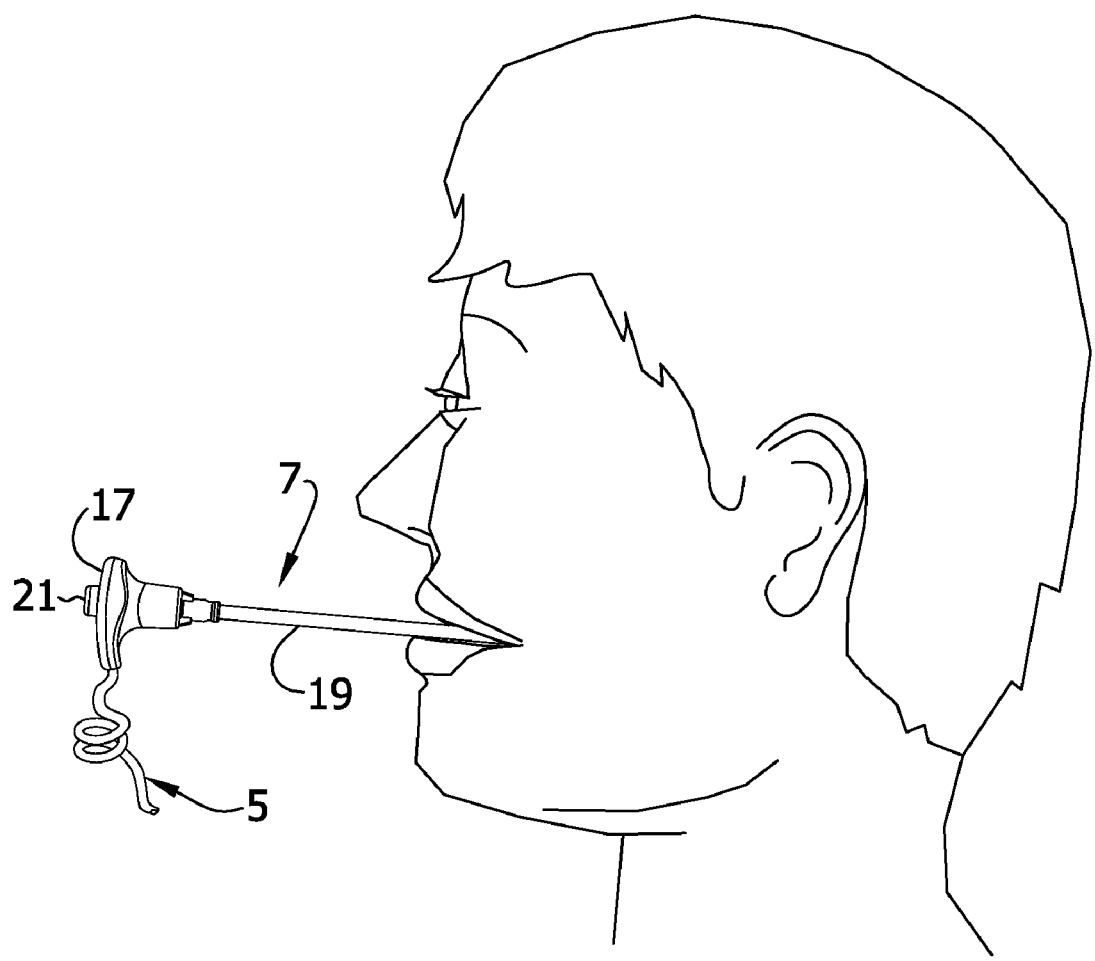
FIG. 2A is a schematic perspective showing the probe as received in a patient's mouth.

The housing 9 includes a compartment (not shown) generally at the rear of the housing that can receive a distal portion of the probe 7 into the housing for holding the probe and isolating the distal portion from the environment when not in use. FIG. 1 illustrates the probe 7 being pulled by the other hand H1 from the compartment in preparation for use. The housing 9 also has a receptacle 13 that receives a suitable container such as a carton C of probe covers 12 (see, FIG. 2). In use, the top of the carton C is removed, exposing open ends of the probe covers. The distal portion of the probe 7 can be inserted into the open end of the carton C and one of the probe covers 12 can be releasably secured in an annular recess 14. Pushers 15 are located at the junction of a handle 17 of the probe 7 with a probe shaft 19. The probe shaft is protected from contamination by the cover 12 when the distal portion of the probe shaft 19 is inserted, for example, into a patient's mouth (FIG. 2A). In order to be used for insertion into the mouth or other larger cavity (e.g., the rectum), the probe shaft 19 is relatively long and thin. For example in one embodiment, the ratio of the length of the probe shaft to its diameter is at least about three, in another embodiment, the ratio is at least about six, in a yet another embodiment, the ratio is at least about twelve, and in still another embodiment the ratio is about eighteen. The length of the probe shaft is measured from where it exits the probe handle 17 above the recess 14 to its distal end from which the metal tip 29 projects. The diameter of the probe shaft 19 is generally constant along its length, but an average or median diameter might be used to calculate the ratio of length to diameter of a non-constant diameter probe shaft. A button 21 on the probe handle 17 can be depressed to cause the pushers 15 to move forward for releasing the probe cover 12 from the probe shaft 19. Subsequent to use, the probe cover 12 is discarded. Other ways of capturing and releasing probe covers may be used without departing from the scope of the present invention.

Figure 3:
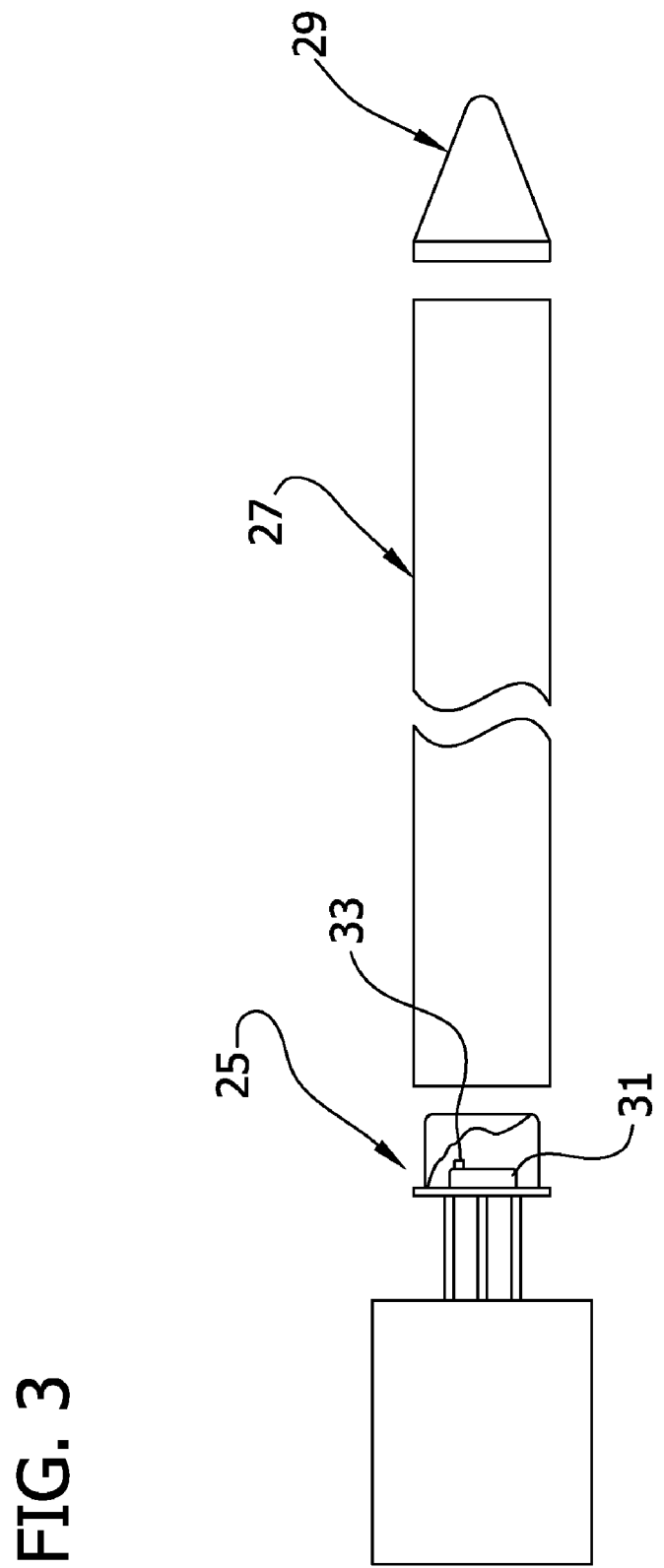
FIG. 3 is a schematic, fragmentary elevation of internal components of the probe showing a configuration of a first embodiment.

One aspect of the present invention is directed to a temperature sensing arrangement that senses infrared radiation to acquire the body temperature (FIG. 2A). Although the preferred embodiments of the present invention are for acquisition of body temperature, it will be understood that the principles of the present invention may be applied to measure the temperature of an "object," be it a living being or otherwise. Moreover, the object being measured may be solid, liquid or gas. In a first embodiment illustrated in FIG. 3, the internal components of the probe 7 include a temperature sensor 25, a waveguide 27 and a conical metal tip 29 (the reference numerals indicating their subjects generally). In the illustrated embodiments, the tip 29 is made of aluminum, but other materials (including non-metals) may be used within the scope of the present invention. These components are supported by the probe shaft 19 (not shown in FIG. 3). The metal tip 29 is mounted on a distal end of the probe shaft 19 and is heated up by contact with tissue in the mouth. The metal tip 29 has a high thermal conductivity, low heat capacity and low mass, and a shape selected to warm rapidly to the temperature of the body tissue in thermal contact with the tip. The conical shape of the tip 29 improves its emissivity and reduces reflection of infrared radiation. Infrared radiation emitted from the heated metal tip 29 is received into the waveguide 27 that has a reflective material (e.g., a layer of gold) on its interior. The waveguide 27 transmits the infrared radiation with minimal losses along its length to a proximal end where it impinges upon the temperature sensor 25. The temperature sensor comprises a thermoelectric effect sensor in the form of a thermopile 31 positioned adjacent to the proximal end of the waveguide 27. It will be understood that other thermoelectric effect sensors (not shown), such as pyroelectric sensors, microbolometers or other sensors that do not employ the thermoelectric effect may be used without departing from the scope of the present invention.

The thermopile 31 emits a voltage corresponding to the temperature of the "hot junction" relative to the "cold junctions". It includes a plurality of individual thermocouples (not shown) connected in series. Each thermocouple has a cold junction and a hot junction. See, U.S. Pat. No. 4,722,612 of Junkert et al. issued Feb. 2, 1988. The hot junction is typically formed by a small blackbody ("a target area") onto which the infrared radiation is directed. The blackbody rapidly heats to a temperature corresponding to the temperature of the object radiating the infrared radiation. The thermopile 31 generates an analog output signal (voltage) representative of the amount of infrared radiation that impinges thereon. The illustrated embodiment of the present invention is designed to sense infrared radiation emitted by the metal tip 29, which is related to the temperature of the biological surface tissue in the mouth of a human body. It is to be understood that a thermometer incorporating the principles of the present invention could be used to measure the temperature of tissue at other locations on the body (e.g., in the rectum, axilla, etc.) within the scope of the present invention.

The temperature sensor 25 further includes a second sensor secured to the thermopile 31 in a suitable manner or incorporated into the thermopile. The second sensor generates an analog output signal (resistance) representative of the temperature of the thermopile 31. One sensor suitable for this purpose is a thermistor 33. The second sensor or thermistor 33 is sometimes referred to as the ambient sensor because it effectively measures the ambient temperature of the room in which the thermometer 1 is being used, and thus the temperature of the thermopile 31. In the illustrated embodiment, it is necessary to know the temperature of the thermopile 31 in determining the actual body temperature from its output signals. The temperature sensor 25 is preferably sealed within the probe shaft 19. The probe cover 12 is received over the metal tip 29 and probe shaft 19 in use of the thermometer. The probe cover 12 fits over the distal end of the probe 7 and is releasably held on the probe shaft 19 by the annular recess 14. The probe cover 12 is described in more detail hereinafter with respect to a second embodiment of the thermometer.

A tubular waveguide 27 is placed in proximity with the viewing aperture of the thermopile 31. It is preferable that the waveguide 27 be brass or copper with the inside diameter plated with gold to achieve the highest possible reflectivity in the infrared region of the spectrum, i.e. a wavelength of 8-12 microns.

Figure 4:
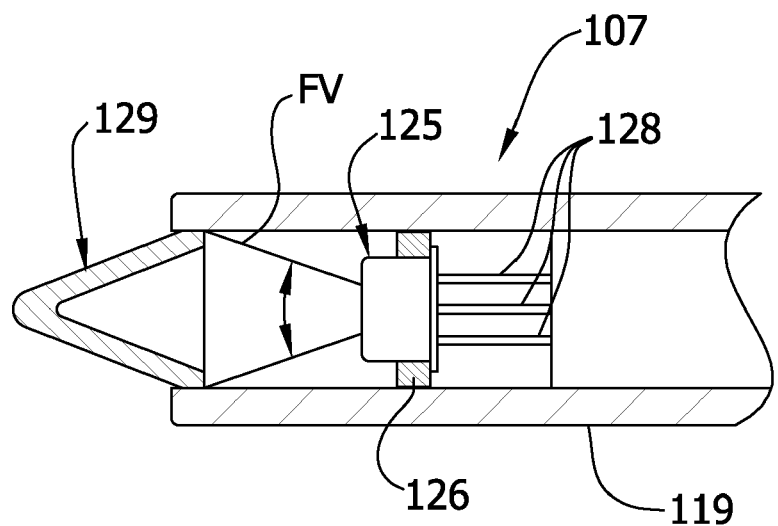
FIG. 4 is a schematic, fragmentary elevation of a probe of a second embodiment.

Referring now to FIG. 4, a probe of a second embodiment (indicated generally at 107) is shown to comprise a probe shaft 119 and a metal tip 129 mounted in a distal end of the probe shaft (only a fragmentary portion of which is shown). Parts of the probe 107 corresponding to those of the probe 7 of the first embodiment are given the same reference numeral, plus "100". Unlike the probe 7 of the first embodiment, there is no waveguide 27, and a temperature sensor 125 is mounted by a collar 126 within the probe shaft 119 near the distal end of the probe shaft. Thus, infrared radiation emitted from the metal tip 129 is seen directly by a thermopile (not shown) of the temperature sensor 125 and is not transmitted by any intervening structure (e.g., a waveguide) to the temperature sensor. The cone-shaped field of vision FV of the thermopile is illustrated in FIG. 4, and is equal to the width of the base of the metal tip 129 where the field of vision intersects the base of the metal tip. In order to isolate sensor 125 from heat in the oral cavity, the sensor is placed as far away from the distal end of the probe 107 as possible. In that case, sensor 125 would have a narrow field of vision so that it sees only the tip 129. Thus, the thermopile is able to see the entire metal tip 129. An example of suitable arrangement of the temperature sensor 125 near the distal end of a probe in the tympanic thermometer context is shown in co-assigned U.S. patent application Ser. No. 10/480,428, filed Dec. 10, 2003, the disclosure of which is incorporated herein by reference. A similar arrangement may be used here. Wires 128 from the temperature sensor 125 extend through the probe shaft 119 to its handle (not shown). A flex circuit (not shown) or other suitable electrical connection structure may be used.

Figure 6:
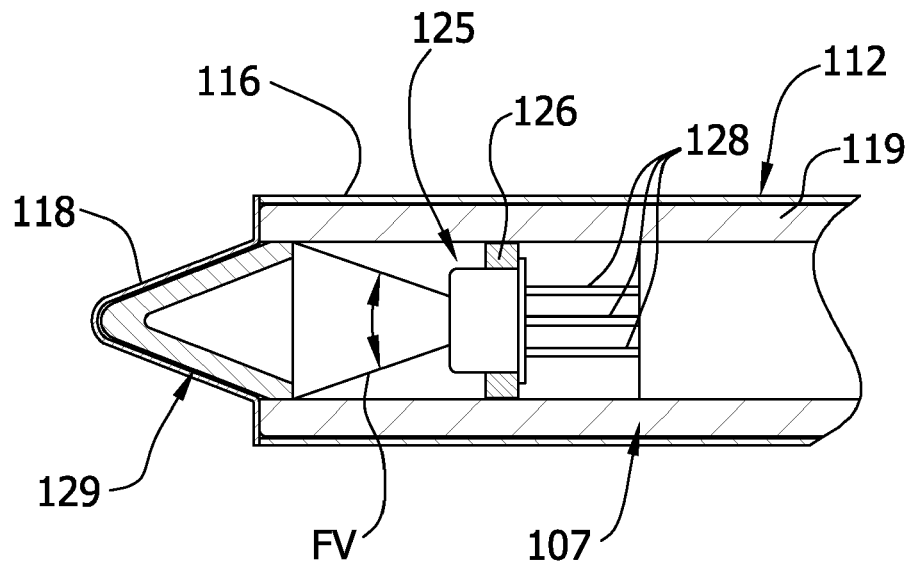
FIG. 6 is an enlarged, fragmentary elevation similar to FIG. 4 but showing the probe cover on the probe.
Figure 5:
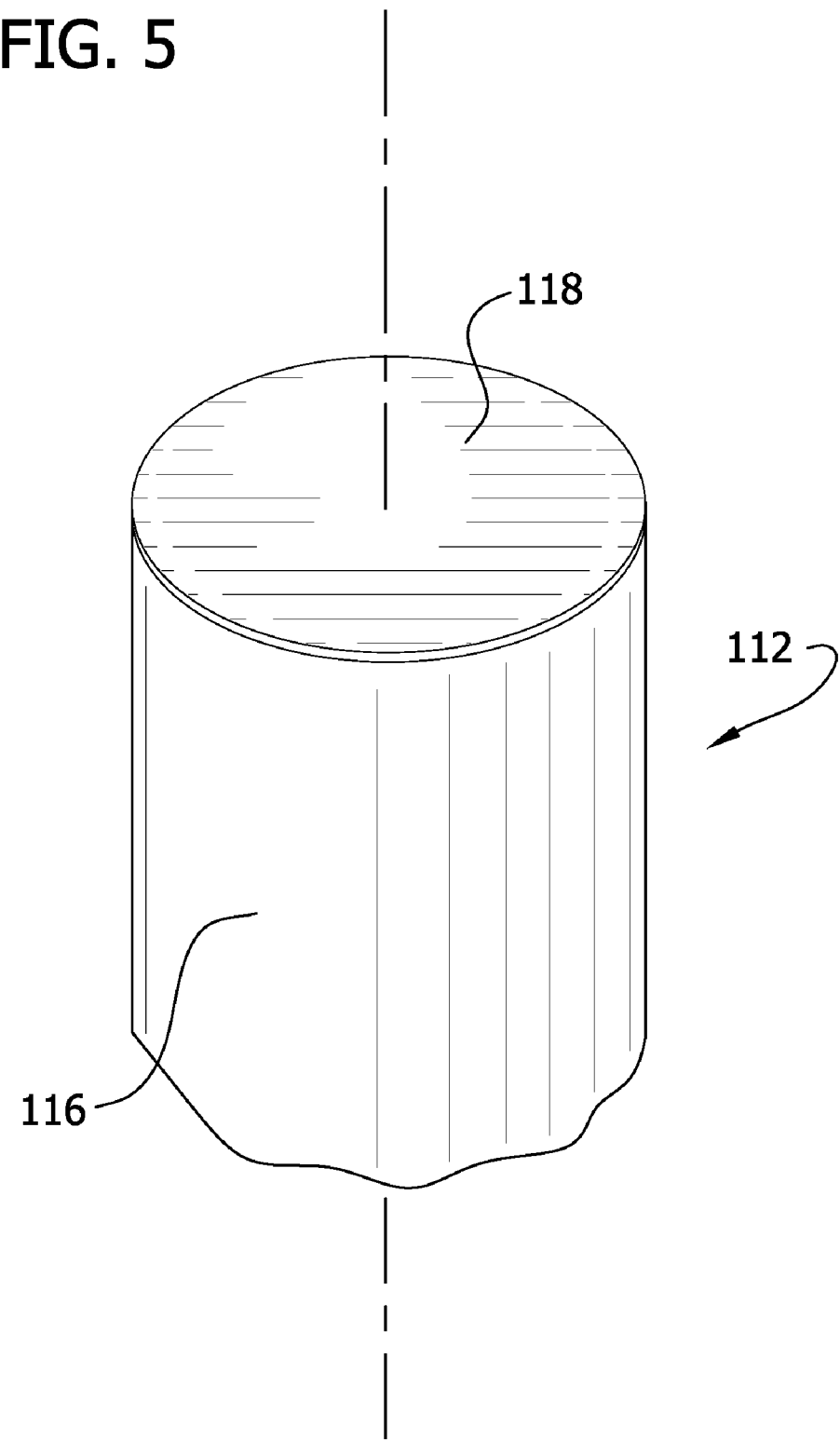
FIG. 5 is a perspective of a probe cover.

Referring now also to FIGS. 5 and 6, a probe cover generally indicated at 112 for covering the probe shaft 119 in use to prevent contamination and reduction or loss of operability (e.g., by saliva) upon insertion into the mouth. The probe cover 112 includes a tubular body 116 of and a stretchable film 118 closing one end of the tubular body. The film 118 can be constructed, for example, from a lower density plastic (e.g., low density polyethylene (LDPE)), while the body 116 is constructed from a higher density plastic (e.g., high density polyethylene (HDPE)). As shown in FIG. 5 prior to placement on the probe shaft 119, the film 118 extends generally perpendicularly across the end of the tubular body. When applied over the probe shaft 119, the film 118 engages and is stretched over the metal tip 129 of the probe shaft. Thus, the film 118 closely conforms to the shape of the exterior surface of the metal tip 129 when the probe cover 112 is mounted on the probe shaft 119. Thus, conductive heat transfer from the body tissue through the film 118 to the metal tip 129 is facilitated.

Figure 7:
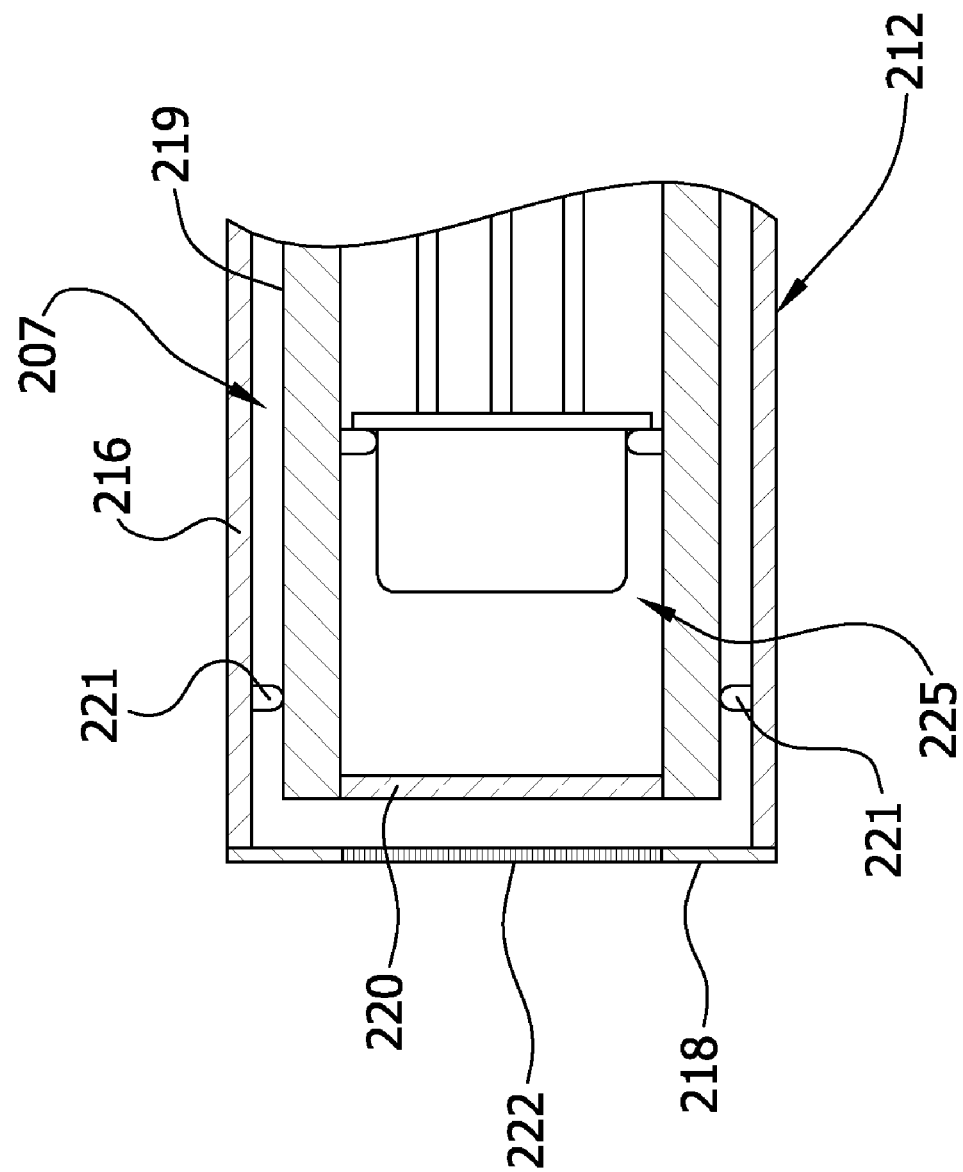
FIG. 7 is an enlarged, fragmentary elevation similar to FIG. 4 but showing a probe and probe cover of a third embodiment.

A third embodiment of the probe 207 is shown in FIG. 7 to comprise a probe shaft 219 and a temperature sensor 225 mounted near the distal end of the probe shaft similar to the embodiment of FIGS. 4-6. Parts of the probe 207 corresponding to those of the probe 107 will be given the same reference numeral, plus "100". In the third embodiment, the metal tip 125 is omitted. Instead, the probe shaft 219 has a transparent window 220 closing off its distal end. For purposes of the present invention, the window 220 need only be transparent to infrared radiation. In other respects, the construction of the probe 207 can be the same as the probe 107 of the second embodiment.

A probe cover 212 of the third embodiment includes a tubular body 216 and film 218 closing the distal end of the body. The tubular body 216 has spacers 221 (two of which are shown) on its interior that engage and space the tubular body from the probe shaft 219. The spacers 221 may have other configurations, different in number or may be omitted without departing from the scope of the present invention. When fully seated on the probe 207, the probe cover film 218 (unlike the first two embodiments) does not engage the end of the probe shaft 219, but is spaced axially from the end of the probe shaft. A central region 222 of the film has metal deposited on it. It is to be understood that the metal deposit need not be located in or confined to a central region. For example, the entire film may be metalized. The metal central region 222 replaces the metal tip 29, 129 of the prior two embodiments. The field of vision of the thermopile (not shown) of the temperature sensor 225 encompasses the central region 222. The central region can be formed by other materials having high thermal conductivity, low heat capacity and low mass.

Figure 8:
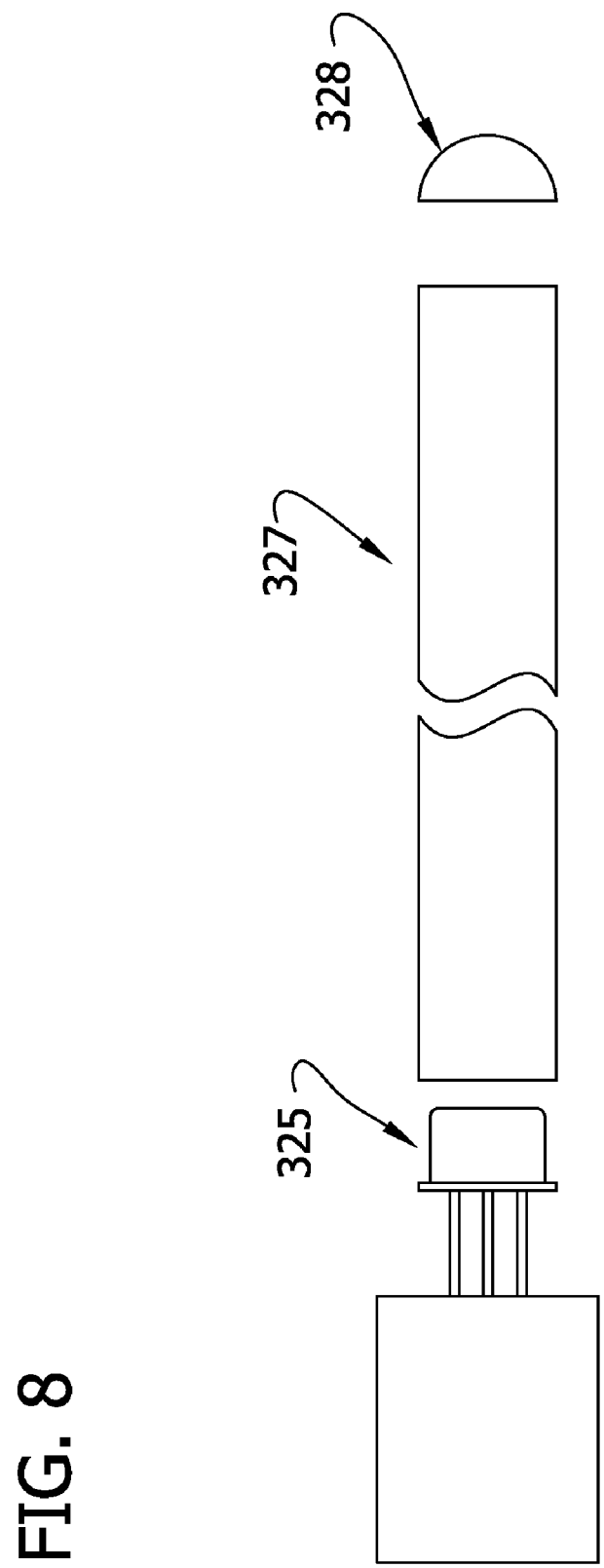
FIG. 8 is a schematic, fragmentary elevation of internal components of the probe showing a configuration of a fourth embodiment.

Components of a probe of a fourth embodiment are show in FIG. 8 to comprise a temperature sensor 325, a waveguide 327 and a lens 328. The probe of the fourth embodiment generally corresponds to the probe 7 of the first embodiment in that both have a waveguide (27 and 327). Parts of the probe of the fourth embodiment corresponding to parts of the probe 7 of the first embodiment will be given the same reference numerals, plus "300". In the fourth embodiment, infrared radiation from body tissue (e.g., tissue inside the mouth) is focused by the lens into the waveguide 327. The waveguide conducts the infrared radiation to the temperature sensor 325 in substantially the same way as the waveguide 27 of the first embodiment. Thus in the fourth embodiment the temperature sensor 325 directly views the body tissue, not any intermediate structure such as a metal tip.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above thermometers and methods of their use without departing from the scope of the invention, it is intended that all matter contained in the above description and shown in the accompanying drawings shall be interpreted as illustrative and not in a limiting sense.

What is claimed is:

1. A probe cover for an infrared electronic thermometer comprising:

a generally tubular body having open first and second ends, the body being sized and shaped to receive a probe of the infrared electronic thermometer into the body through the first end; and a film closing the second end of the body, the film including a non-metallic region and a metallic region defining a blackbody portion for rapidly equilibrating to a temperature corresponding to the temperature of an object for viewing by a sensor of the electronic thermometer to measure the temperature of the object.

2. A probe cover as set forth in claim 1 wherein the blackbody portion is located in a central region of the film.

3. A probe cover as set forth in claim 2 wherein the blackbody portion is made of a different material than the tubular body.

4. A probe cover as set forth in claim 1 wherein the cover comprises at least two spacers on an interior of the tubular body for engaging and spacing the body from the probe.

5. A probe cover as set forth in claim 1 wherein when the probe is received in the probe cover, the film is spaced axially away from the probe so that the film does not engage the probe.

6. A probe cover for an infrared electronic thermometer comprising:

a generally tubular body having open first and second ends, the body being sized and shaped to receive a probe of the infrared electronic thermometer into the body through the first end; and a film closing the second end of the body, the film including a non-metallic region and a metallic region defining a blackbody portion for rapidly equilibrating to a temperature corresponding to the temperature of an object for viewing by a sensor of the electronic thermometer to measure the temperature of the object, the blackbody portion being made of a different material than the tubular body.

\* \* \* \* \*